United States Patent
Shen et al.

(10) Patent No.: US 10,291,518 B2
(45) Date of Patent: *May 14, 2019

(54) MANAGING FLOW TABLE ENTRIES FOR EXPRESS PACKET PROCESSING BASED ON PACKET PRIORITY OR QUALITY OF SERVICE

(71) Applicant: Juniper Networks, Inc., Sunnyvale, CA (US)

(72) Inventors: Qiang Shen, Campbell, CA (US); Si Yuan Tong, San Jose, CA (US); Jianhua Gu, Pleasanton, CA (US); Guangsong Huang, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/939,937

(22) Filed: Mar. 29, 2018

(65) Prior Publication Data
US 2018/0227236 A1 Aug. 9, 2018

Related U.S. Application Data

(63) Continuation of application No. 15/070,396, filed on Mar. 15, 2016, now Pat. No. 9,935,885.

(51) Int. Cl.
*H04L 12/28* (2006.01)
*H04L 12/715* (2013.01)
(52) U.S. Cl.
CPC .................... *H04L 45/64* (2013.01)
(58) Field of Classification Search
CPC ...................................................... H04L 12/28

USPC ......................................................... 270/339
See application file for complete search history.

(56) References Cited

U.S. PATENT DOCUMENTS

| 7,684,348 B2 | 3/2010 | Zhang et al. |
| 8,955,107 B2 | 2/2015 | Eyada |
| 9,935,885 B1 | 4/2018 | Shen et al. |
| 2015/0143456 A1* | 5/2015 | Raleigh ............ H04W 12/08 726/1 |

OTHER PUBLICATIONS

Juniper Networks, "Class of Service for Security Devices," https://www.juniper.net/documentation/en_US/junos12.1x44/information-products/pathway-pages/security/cos-index.html, Dec. 6, 2013, 1 page.

(Continued)

*Primary Examiner* — Dang T Ton
(74) *Attorney, Agent, or Firm* — Harrity & Harrity, LLP

(57) ABSTRACT

A device may receive a packet associated with a flow and may identify a capacity indicator associated with a flow table. The capacity indicator may indicate an available storage capacity associated with the flow table. The flow table may be stored by another device and may include entries for one or more flows and one or more corresponding actions to be taken in association with the one or more flows. The device may determine a service indicator that indicates a priority associated with the flow and may compare the capacity indicator and the service indicator. The device may selectively provide a message to the other device based on comparing the capacity indicator and the service indicator. The message may include an instruction for the other device to store an entry, associated with the flow, in the flow table.

20 Claims, 8 Drawing Sheets

(56) References Cited

OTHER PUBLICATIONS

Roughan et al., "Class-of-Service Mapping for QoS: A Statistical Signature-based Approach to IP Traffic Classification," http://conferences.sigcomm.org/imc/2004/papers/p135-roughan.pdf, Nov. 15, 2002, 14 pages.

\* cited by examiner

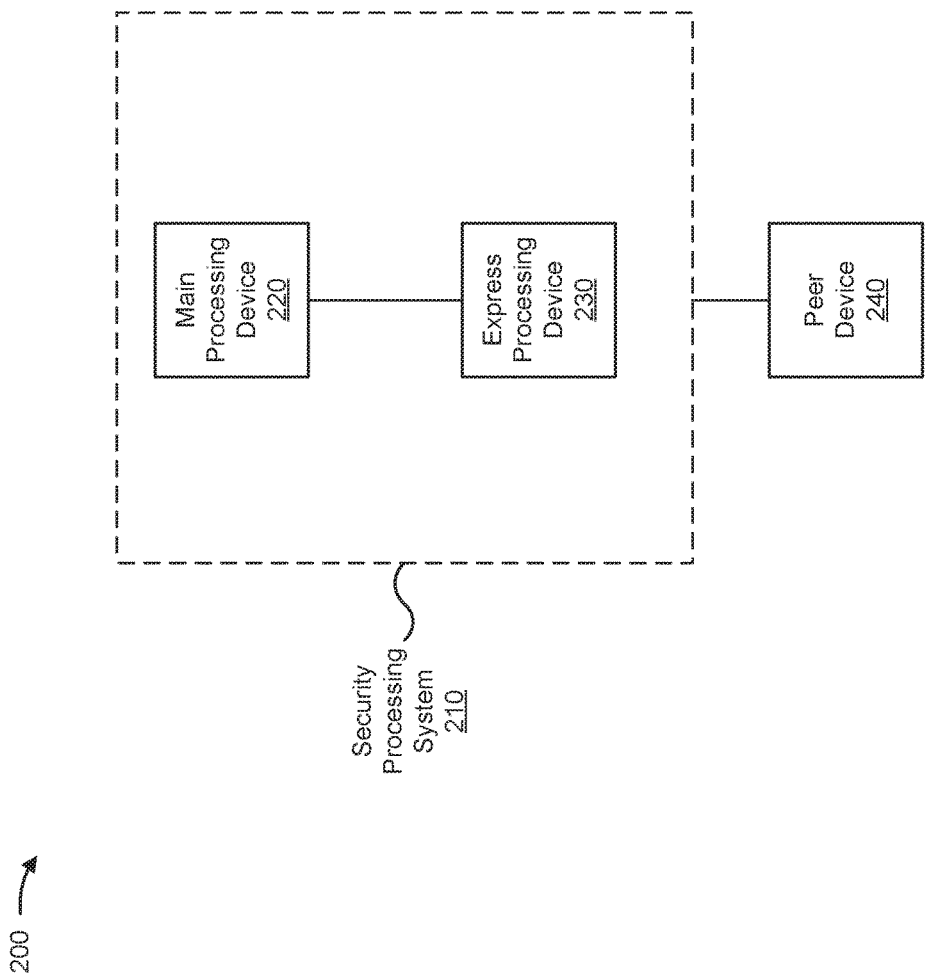

MANAGING FLOW TABLE ENTRIES FOR EXPRESS PACKET PROCESSING BASED ON PACKET PRIORITY OR QUALITY OF SERVICE

RELATED APPLICATION

This application is a continuation of U.S. patent application Ser. No. 15/070,396, filed Mar. 15, 2016 (now U.S. Pat. No. 9,935,885), which is incorporated herein by reference.

BACKGROUND

A security device, such as a firewall, may perform packet processing on network traffic (e.g., may apply packet filters, security policies, screens, or the like). Flow-based packet processing treats related packets in the same way, depending on characteristics that were established for a first packet associated with the flow.

SUMMARY

In some implementations, a device may include one or more processors to receive a packet associated with a flow. The one or more processors may identify a capacity indicator associated with a flow table. The capacity indicator may indicate an available storage capacity associated with the flow table. The flow table may be stored by another device and may include entries for one or more flows and one or more corresponding actions to be taken in association with the one or more flows. The one or more processors may determine a service indicator that indicates a priority associated with the flow. The one or more processors may compare the capacity indicator and the service indicator. The one or more processors may selectively provide a message to the other device based on comparing the capacity indicator and the service indicator. The message may include an instruction for the other device to store an entry, associated with the flow, in the flow table.

In some implementations, a device may include one or more processors to receive a packet associated with a flow. The one or more processors may determine a first capacity indicator associated with a flow table stored by the device. The first capacity indicator may identify an available storage capacity of the flow table. The first capacity indicator may be determined at a first time. The one or more processors may provide the packet and the first capacity indicator to another device. The one or more processors may receive a message from the other device based on providing the packet and the first capacity indicator. The message may include a service indicator associated with the flow. The service indicator may identify a priority associated with the flow. The one or more processors may determine a second capacity indicator associated with the flow table. The second capacity indicator may be determined at a second time. The one or more processors may selectively add an entry, associated with the flow, to the flow table based on the service indicator and the second capacity indicator.

In some implementations, a system may include a first processor to receive a packet associated with a flow. The first processor may determine a capacity indicator associated with a flow table stored by the first processor. The capacity indicator may identify an available storage capacity of the flow table. The first processor may output the packet and the capacity indicator. The system may include a second processor to receive the packet and the capacity indicator. The second processor may determine a service indicator that indicates a priority associated with the flow. The second processor may compare the service indicator and the capacity indicator. The second processor may selectively provide a message to the first processor based on comparing the service indicator and the capacity indicator. The message may include an instruction for the first processor to add an entry, associated with the flow, to the flow table.

BRIEF DESCRIPTION OF THE DRAWINGS

FIG. 2 is a diagram of an example environment in which systems and/or methods, described herein, may be implemented;

DETAILED DESCRIPTION

Figure 1A:
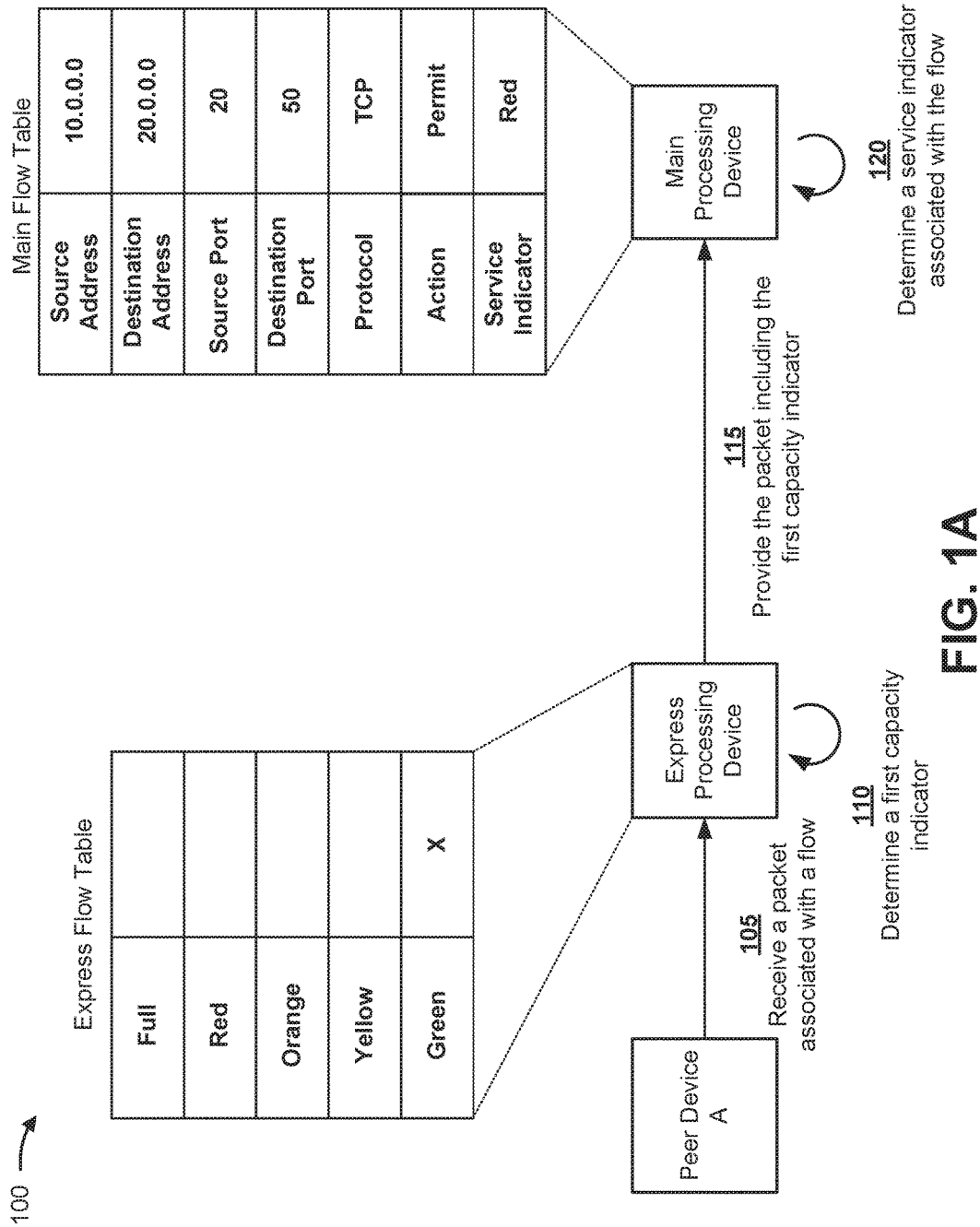
FIGS. 1A-ID are diagrams of an overview of an example implementation described herein.

The following detailed description of example implementations refers to the accompanying drawings. The same reference numbers in different drawings may identify the same or similar elements.

A security system, such as a firewall, may include an express processing device and a main processing device that may process network traffic (e.g., packets). As a packet reaches the security system, the express processing device may perform initial packet processing on the packet (e.g., authentication, verification, filtering, or screening), and may forward the packet to the main processing device for additional packet processing. The main processing device may receive the packet, may process the packet, and may store an entry for a flow (e.g., a sequence of packets that include one or more shared attributes) associated with the packet.

For example, the main processing device may execute a service, such as a screen, a route lookup, a policy lookup, a service lookup, a network address translation (NAT) technique, or the like, and may store an entry, including information regarding treatment of subsequent packets associated with the flow, in a flow table of the main processing device (e.g., a main flow table).

The main processing device may store the entry in the main flow table, which, in some cases, may indicate that the main processing device has permitted network traffic associated with the flow to pass through the security system. In this way, the main processing device may perform less packet processing on subsequent packets associated with the flow. For example, the main processing device may receive subsequent packets associated with the flow, may identify the entry in the main flow table (e.g., based on a flow identifier, such as five-tuple information that includes a source address, a source port identifier, a destination address, a destination port identifier, and a protocol identifier), and may process the subsequent packets accordingly based on an association between the flow identifier and information stored in the main flow table.

In some cases, the security system may provide express processing. Express processing of a packet may refer to processing the packet without forwarding the packet to the main processing device for additional packet processing. The main processing device may provide, to the express processing device, an instruction (e.g., via an entry management message) to store an entry for the flow in a flow table of the express processing device (e.g., an express flow table) and may provide information regarding treatment of the flow (e.g., an action or a security policy). In this way, the express processing device may process subsequent packets of the flow, and may not be required to forward the subsequent packets to the main processing device for packet processing, thereby reducing latency, improving throughput, and conserving processor and/or memory resources of the main processing device.

However, the express processing device may have fewer memory resources than the main flow table and, thus, may not be capable of storing a large quantity of entries. Thus, the main processing device may inundate the express processing device with entry management messages (e.g., including instructions to store entries), thereby consuming processor and/or memory resources. Additionally, entries for low priority flows (e.g., flows that may not require reduced latency, improved throughput, or the like) may occupy the express flow table, thereby preventing the express processing device from storing entries associated with higher priority flows in the express flow table.

Implementations described herein may assist a security system in providing express processing for flows, thereby reducing latency, improving throughput, and conserving network resources. For example, implementations described herein may assist a security system in processing higher priority flows at a reduced latency, at an improved throughput, or the like, by storing entries for the higher priority flows in an express flow table. Additionally, implementations described herein may reduce a quantity of entry management messages that are communicated by a main processing device and may prevent an express flow table from being overloaded. Additionally, implementations described herein may improve a speed of packet processing by reducing a quantity of entry management messages that are processed by the express processing device. Thereby, implementations described herein may conserve processor and/or memory resources of the express processing device and/or the main processing device.

FIGS. 1A-1D are diagrams of an overview of an example implementation 100 described herein. For the purposes of FIGS. 1A-1D, assume that a security processing system (e.g., a firewall system or a gateway system) includes an express processing device and a main processing device. As shown in FIG. 1A, and by reference number 105, the express processing device may receive a packet, associated with a flow, from a peer device (e.g., a router or a switch), shown as Peer Device A. As shown by reference number 110, the express processing device may determine a first capacity indicator associated with an express flow table stored by the express processing device. For example, the first capacity indicator may identify a current usage of the express flow table. As shown, assume that the capacity indicator value "Green" indicates that the express flow table has a low quantity of entries stored and, therefore, has a high capacity for storing additional entries.

As shown by reference 115, the express processing device may provide the packet, including the first capacity indicator (e.g., inserted into a header), to the main processing device. The main processing device may perform packet processing on the packet (e.g., execute a policy lookup, apply a security policy, or the like) and may store an entry for the flow in a main flow table stored by the main processing device. For example, as shown, the main processing device may store a flow identifier associated with the flow (e.g., five-tuple information), an action associated with the flow ("Permit"), or the like.

As shown by reference number 120, the main processing device may determine a service indicator associated with the flow. For example, the service indicator may identify a priority for storing an entry for the flow in the express flow table (e.g., thereby facilitating express processing for the flow). For example, the main processing device may determine the service indicator based on information associated with the flow (e.g., five-tuple information). For example, as shown, assume that the main processing device determines that the service indicator includes the value "Red" (e.g., identifying the flow as having a high priority).

Figure 1B:
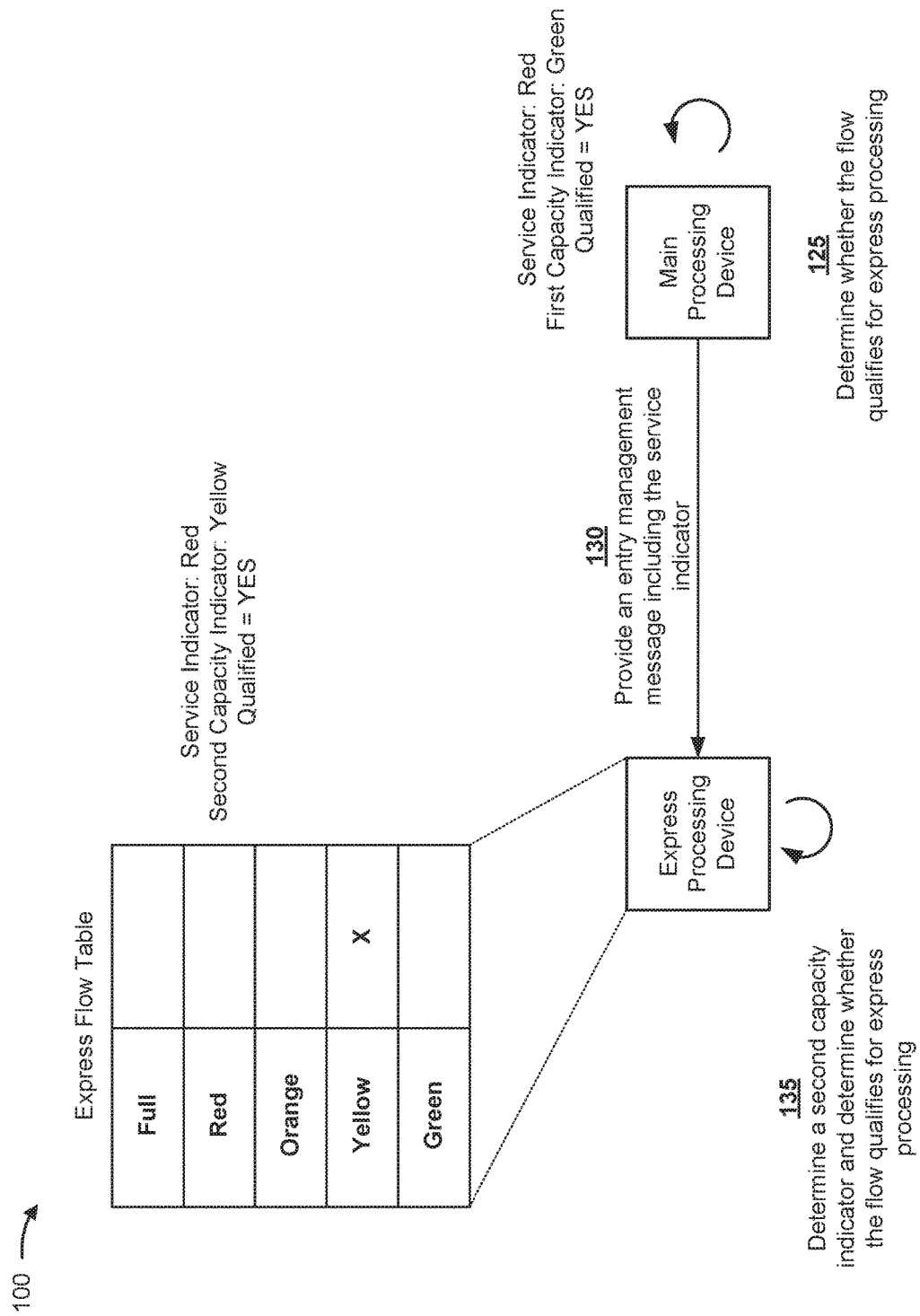

As shown in FIG. 1B, and by reference number 125, the main processing device may determine whether the flow qualifies for express processing. For example, the main processing device may compare the service indicator and the first capacity indicator. For example, assume that values higher than the capacity indicator value "Green" qualify for express processing (e.g., "Yellow," "Orange," and "Red"). As shown, the main processing device determines that the flow qualifies for express processing because the flow is associated with a service indicator value "Red," which indicates a higher priority than the capacity indicator value "Green." As shown by reference number 130, the main processing device may provide an entry management message to the express processing device. The entry management message may include an instruction to store an entry, associated with the flow, in the express flow table. In some implementations, the entry management message may include the service indicator (e.g., inserted into a header).

As shown by reference number 135, the express processing device may determine a second capacity indicator, associated with the express flow table, and may use the second capacity indicator and the service indicator to determine whether the flow qualifies for express processing. The first capacity indicator may be different than the second capacity indicator because the first capacity indicator and the second capacity indicator are determined at different times (e.g., the express flow table may include less available space when the second capacity indicator is determined). For example, and as shown, assume that the second capacity indicator includes the value "Yellow" (e.g., indicating that less space is available in the express flow table than as shown in FIG. 1A). As shown, the express processing device may determine that the flow qualifies for express processing (e.g., because the service indicator value "Red" is higher priority than the capacity indicator value "Yellow").

Figure 1C:
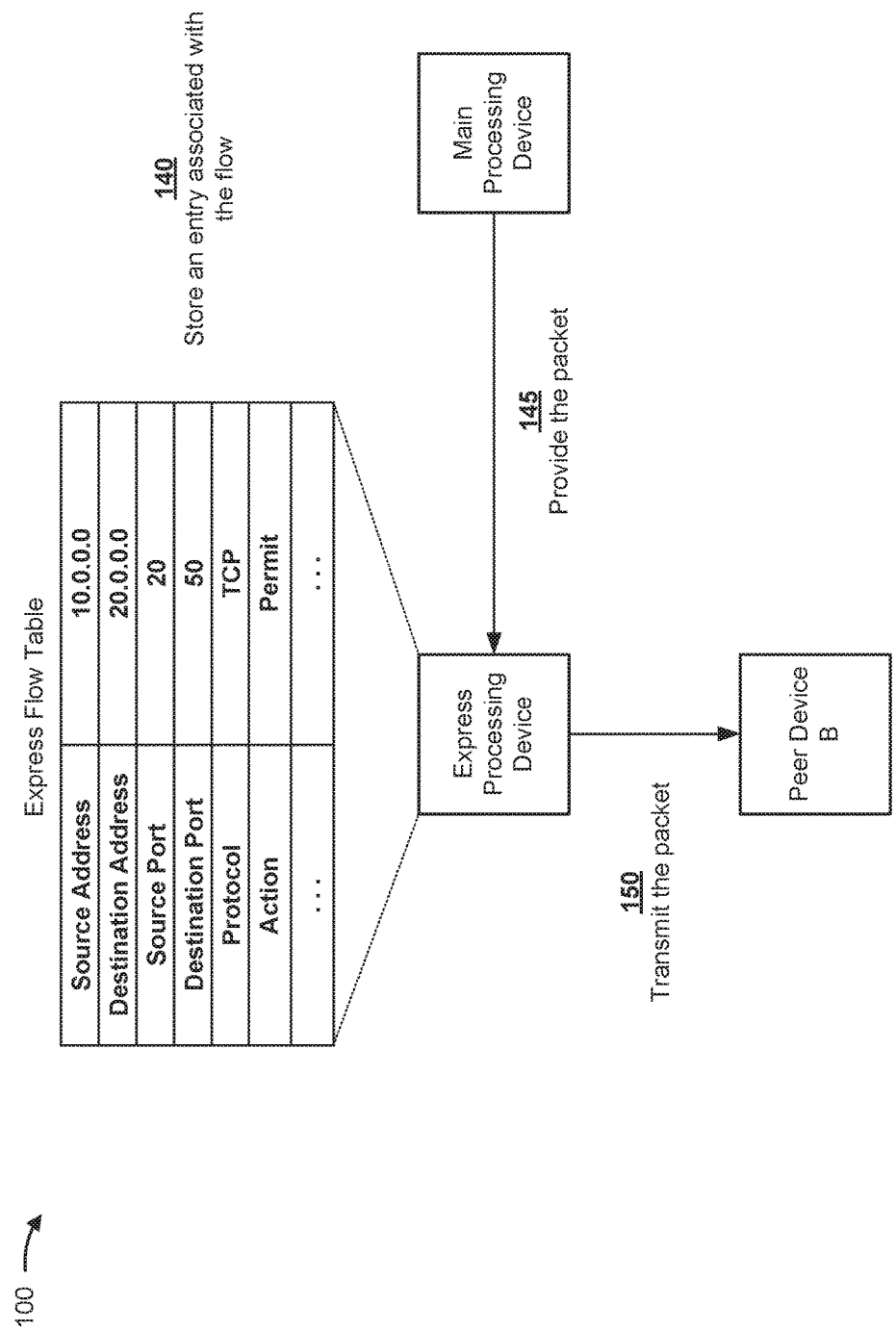

As shown in FIG. 1C, and by reference number 140, the express processing device may store an entry associated with the flow in the express flow table based on determining that the flow qualifies for express processing. As shown, the entry may include a flow identifier (e.g., five-tuple information), an action associated with the flow ("Permit"), or the like. As shown by reference number 145, the main processing device may provide the packet to the express processing device for transmission (e.g., after processing the packet and storing an entry for the flow in the main flow table). As shown by reference number 150, the express processing device may transmit the packet to another peer device, shown as Peer Device B.

Figure 1D:
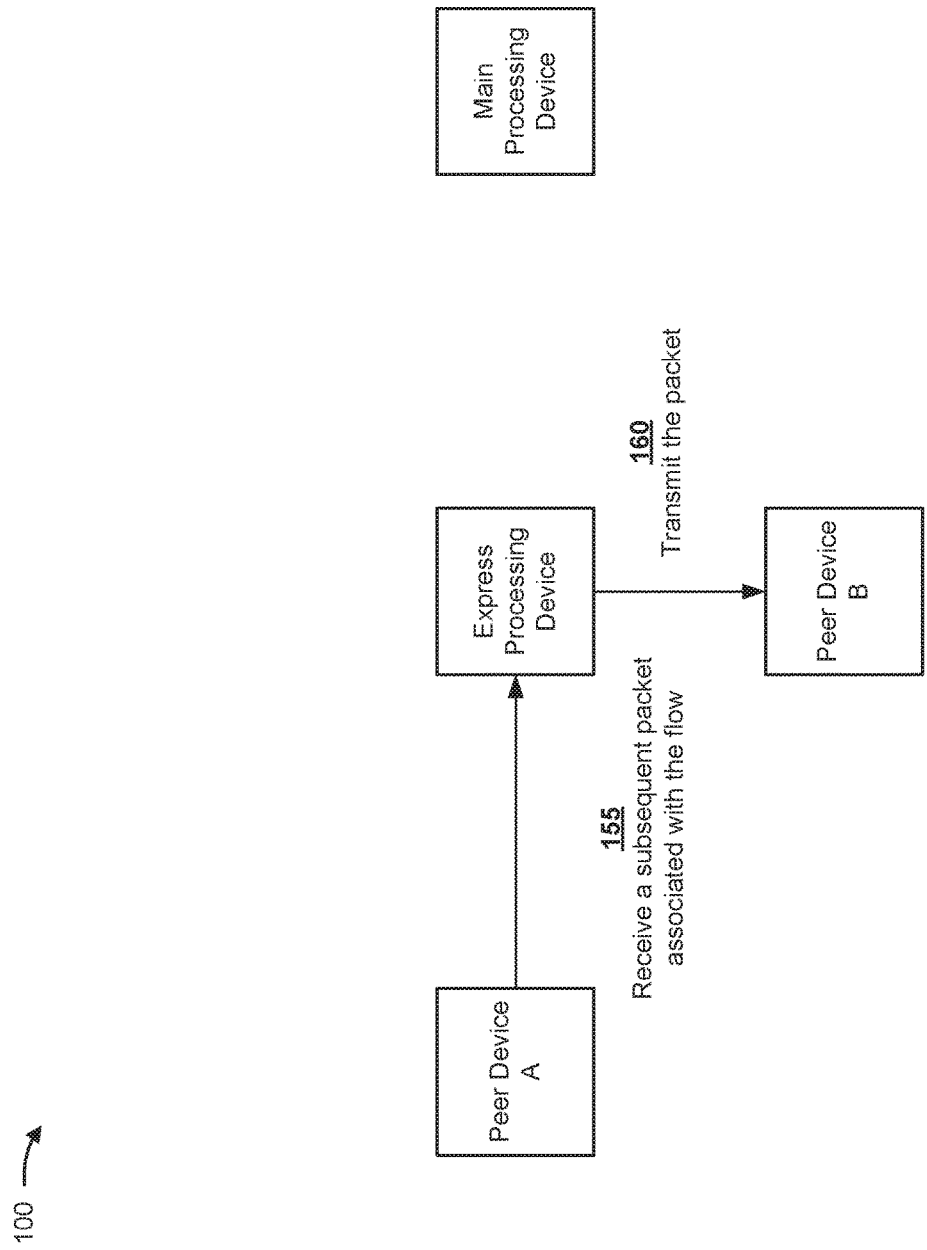

As shown in FIG. 1D, and by reference number 155, the express processing device may receive a subsequent packet associated with the flow. The express processing device may identify the entry associated with the flow (e.g., stored in the express flow table), and may process the packet according to the stored action. As shown by reference number 160, the express processing device may transmit the packet to the other peer device (Peer Device B). In this way, the express processing device may perform express packet processing without having to forward subsequent packets of the flow to the main processing device for additional packet processing, thereby reducing latency and improving throughput.

Implementations described herein may assist a security processing system in managing flow table entries for express packet processing. For example, implementations described herein may assist a security processing system in providing express processing for flows having a particular priority (e.g., requiring a reduced latency, improved throughput, or the like). Additionally, implementations described herein may reduce a quantity of entry management messages that are provided to an express processing device, thereby conserving processor, memory, and network resources. Additionally, implementations described herein may reduce a quantity of entry management messages that the express processing device processes, thereby increasing a speed of packet processing for higher priority flows.

As indicated above, FIGS. 1A-1D are provided merely as examples. Other examples are possible and may differ from what was described regarding FIGS. 1A-D.

FIG. 2 is a diagram of an example environment 200 in which systems and/or methods, described herein, may be implemented. As shown in FIG. 2, environment 200 may include a security processing system 210, which may include a main processing device 220 and an express processing device 230. Furthermore, environment 200 may include a peer device 240. Devices of environment 200 may interconnect via wired connections, wireless connections, or a combination of wired and wireless connections.

Security processing system 210 includes a main processing device 220 and an express processing device 230. Security processing system 210 may process network traffic, for security purposes, for quality of service purposes, for analytics purposes, or the like. In some implementations, main processing device 220 and express processing device 230 may be located proximate to one another (e.g., on a same board, in a same chassis, in a same rack, in a same data center, or in a same geographic location). In some implementations, main processing device 220 and express processing device 230 may be located remote from one another (e.g., on different boards, in different chasses, in different racks, in different data centers, or in different geographic locations).

Main processing device 220 includes one or more devices or one or more components of a device capable of processing and/or transferring network traffic. For example, main processing device 220 may include a router, a switch, a gateway, a firewall, a hub, a bridge, a reverse proxy, a server (e.g., a proxy server, a server executing a virtual machine, etc.), a security device, an intrusion detection device, a load balancer, a similar device, or a component of one of these devices. In some implementations, main processing device 220 may receive network traffic from express processing device 230, may process the network traffic (e.g., may apply security policies, or the like), and/or may provide the network traffic to express processing device 230 for transmission. Additionally, or alternatively, main processing device 220 may store an entry associated with a flow in a flow table associated with main processing device 220. In some implementations, main processing device 220 may store a main flow table and may store entries associated with flows that are processed by main processing device 220.

Express processing device 230 includes one or more devices or one or more components of a device capable of processing and transferring network traffic. For example, express processing device 230 may include a router, a switch, a gateway, a firewall, a hub, a bridge, a reverse proxy, a server (e.g., a proxy server, a server executing a virtual machine, etc.), a security device, an intrusion detection device, a load balancer, a line card (e.g., in a chassis-based system), a similar device, or a component of one of these devices. In some implementations, express processing device 230 may receive network traffic from peer device 240, and may provide the network traffic to main processing device 220 for processing.

Additionally, or alternatively, express processing device 230 may store an entry associated with a flow in a flow table associated with express processing device 230, which may allow express processing device 230 to process network traffic and transmit network traffic to another peer device without requiring that express processing device 230 provide the network traffic to main processing device 220. In some implementations, express processing device 230 may store an express flow table and may store entries for flows that correspond to entries stored by main processing device 220. For example, main processing device 220 may provide an entry management message that instructs express processing device 230 to store an entry associated with a flow in the express flow table. Additionally, or alternatively, express processing device 230 may store a subset of entries associated with flows that are processed by main processing device 220 (e.g., may store fewer entries than main processing device 220). In some implementations, the express flow table may be stored locally by express processing device 230, and the main flow table may be stored locally by main processing device 220.

Peer device 240 includes one or more devices capable of receiving and/or providing network traffic. For example, peer device 240 may include a traffic transfer device, such as a router, a routing component, a switch, a gateway, a firewall, a hub, a bridge, a reverse proxy, a server (e.g., a proxy server, a server executing a virtual machine, etc.), a security device, an intrusion detection device, a load balancer, or a similar device. Additionally, or alternatively, peer device 240 may include an endpoint device that is a source or a destination for network traffic. For example, peer device 240 may include a computer or a similar device. Peer device 240 may receive network traffic from and/or may provide network traffic to security processing system 210.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
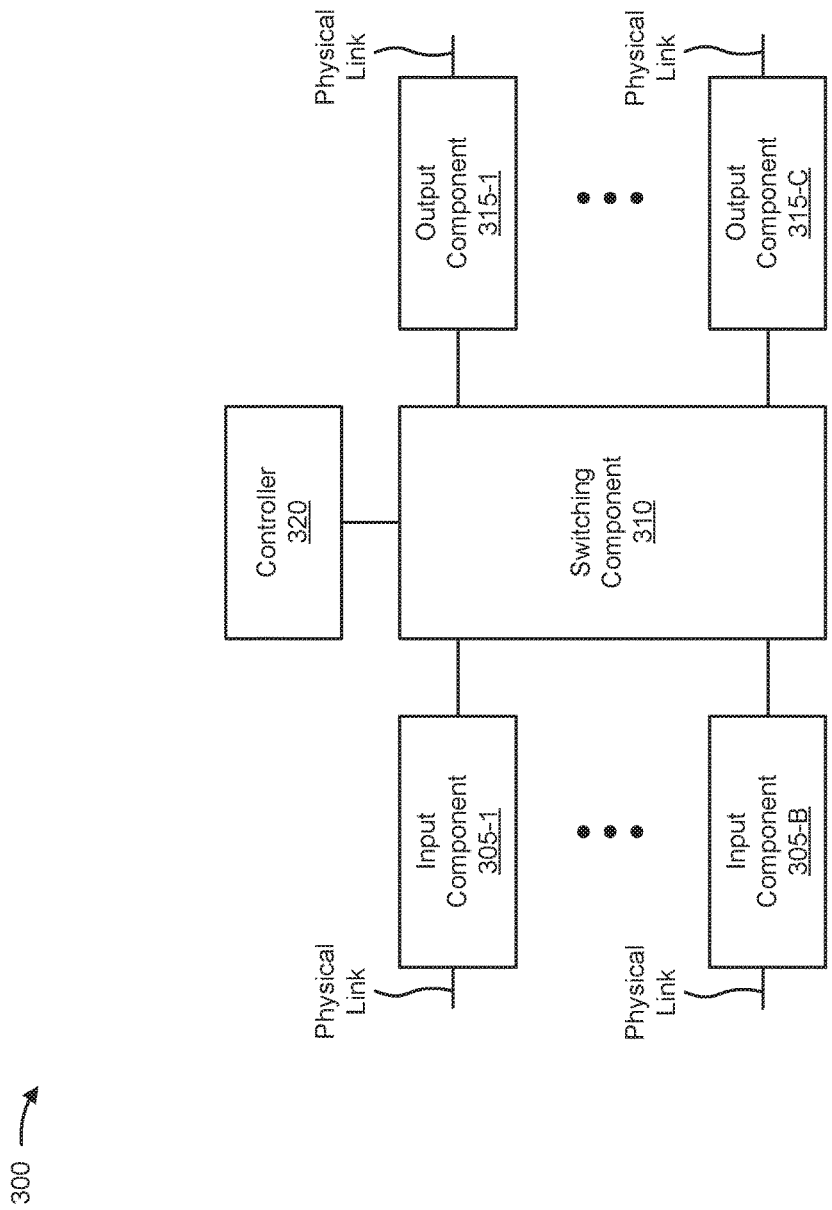
FIG. 3 is a diagram of example components of one or more devices of FIG. 2.

FIG. 3 is a diagram of example components of a device 300. Device 300 may correspond to security processing system 210, main processing device 220, express processing device 230, and/or peer device 240. In some implementations, security processing system 210, main processing device 220, express processing device 230, and/or peer device 240 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections.

Input component 305 may be a point of attachment for a physical link connected to device 300, and may be a point of entry for incoming network traffic (e.g., packets) received by device 300. Input component 305 may process incoming network traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a field-programmable gate array (FPGA), an application-specific integrated circuit (ASIC), and/or another type of processor that can interpret and/or execute instructions. Controller 320 is implemented in hardware, firmware, or a combination of hardware and software. In some implementations, controller 320 may include one or more processors that can be programmed to perform a function. As used herein, a processor is implemented in hardware, firmware, or a combination of hardware and software.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Input component 305, output component 315, and/or controller 320 may perform one or more processes described herein. Input component 305, output component 315, and/or controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with input component 305, output component 315, and/or controller 320 from another computer-readable medium or from another device via a communication interface. When executed, software instructions stored in a memory and/or storage component associated with input component 305, output component 315, and/or controller 320 may cause input component 305, output component 315, and/or controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
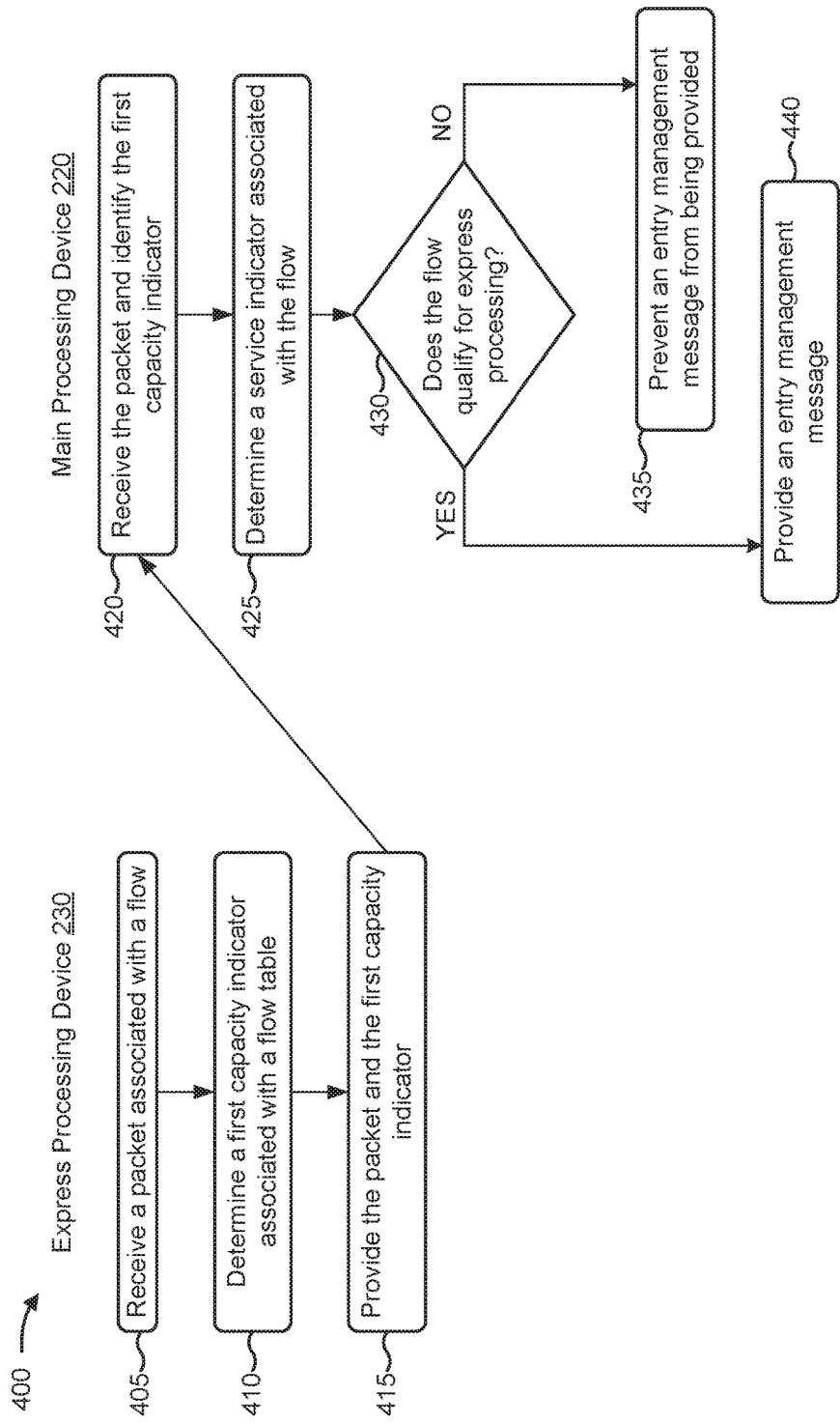
FIGS. 4A and 4B are flow charts of an example process for managing flow table entries for express packet processing.
Figure 4B:
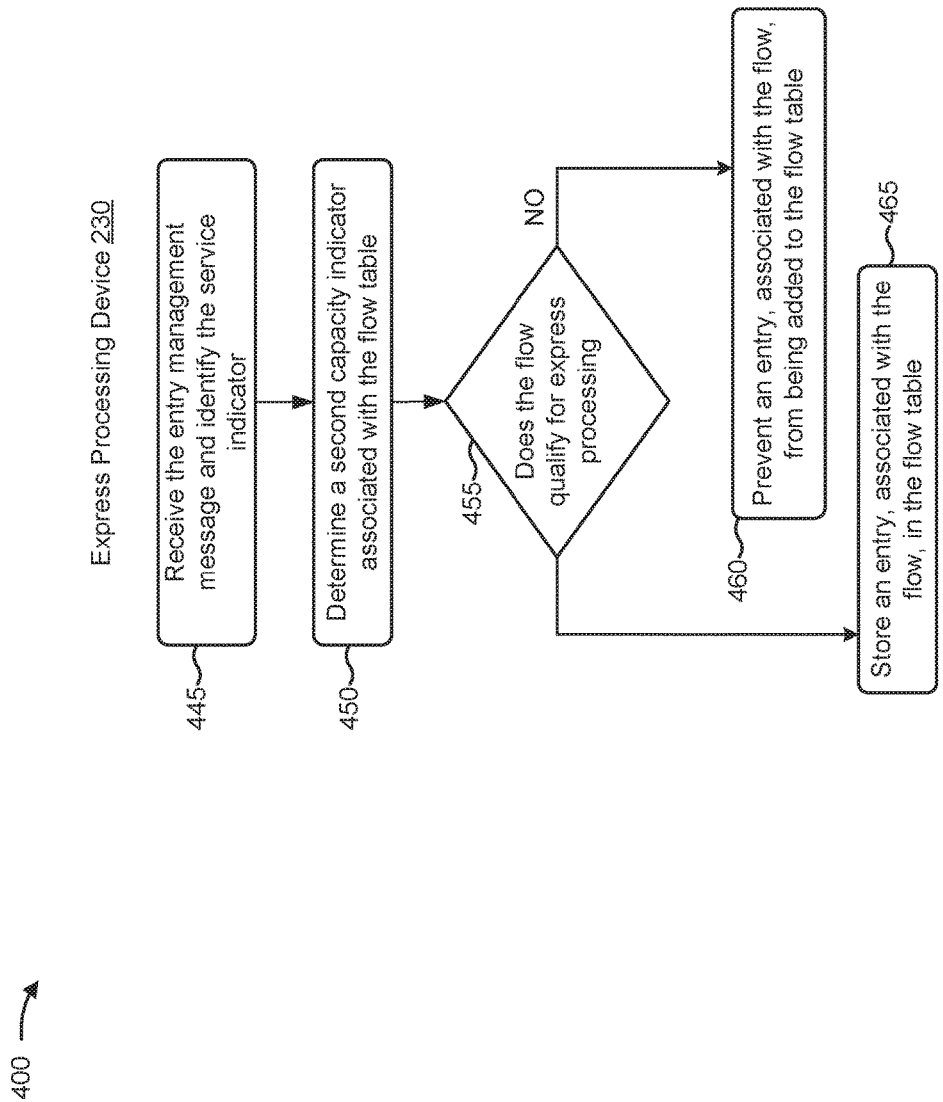

FIGS. 4A and 4B are flow charts of an example process 400 for managing flow table entries for express packet processing. In some implementations, one or more process blocks of FIGS. 4A and/or 4B may be performed by express processing device 230 and/or main processing device 220. In some implementations, one or more process blocks of FIGS. 4A and/or 4B may be performed by another device or a group of devices separate from or including express processing device 230 and/or main processing device 220, such as one or more other devices or components of security processing system 210.

As shown in FIG. 4A, process 400 may include receiving a packet associated with a flow (block 405), and determining a first capacity indicator associated with a flow table (block 410). For example, express processing device 230 may receive a packet associated with a flow and may determine a first capacity indicator associated with an express flow table. As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

In some implementations, the packet may be an initial packet associated with the flow (e.g., the first packet, associated with the flow, that is received by express processing device 230). Additionally, or alternatively, the packet may be a subsequent packet associated with the flow. In some implementations, express processing device 230 may store an express flow table that stores entries associated with flows. As described in more detail elsewhere herein, an entry in the express flow table may allow express processing device 230 to perform express packet processing.

Express processing device 230 may determine a capacity indicator by analyzing a flow table. In some implementations, the capacity indicator may include a parameter that identifies a capacity of the express flow table to store entries. For example, the capacity indicator may identify a current usage of the express flow table (e.g., an indication of an amount of memory space that has been used to store entries and/or an indication of a quantity of entries that are currently stored in the express flow table), an available capacity of the express flow table to store additional entries (e.g., an indication of an amount of memory space available to store entries and/or an indication of a quantity of additional entries that may be stored in the express flow table), or the like. In some implementations, the capacity indicator may include a value, such as a number (e.g., 0, 1, 2, or 3), a string (e.g., "green," "yellow," "orange," "red," "low," "medium," "high," or "full"), a range of values, or the like.

In some implementations, express processing device 230 may receive the packet (e.g., from peer device 240) and may process the packet (e.g., perform authentication, verification, filtering, and/or screening). Additionally, or alternatively, express processing device 230 may provide the packet to main processing device 220 for additional processing, as described below.

As further shown in FIG. 4A, process 400 may include providing the packet and the first capacity indicator (block 415). For example, express processing device 230 may provide the packet and the first capacity indicator to main processing device 220. In some implementations, express processing device 230 may include the first capacity indicator in the packet (e.g., in a header, a trailer, or a payload). Additionally, or alternatively, express processing device 230 may provide the first capacity indicator in association with, but separate from, the packet. In this case, express processing device 230 may provide information that indicates that the first capacity indicator is associated with the packet and/or a flow associated with the packet.

As further shown in FIG. 4A, process 400 may include receiving the packet and identifying the first capacity indicator (block 420). For example, main processing device 220 may receive the packet from express processing device 230, and may identify the first capacity indicator (e.g., included in or associated with the packet). In some implementations, main processing device 220 may process the packet (e.g., may apply a screen, perform a route lookup, perform a policy lookup, perform a service lookup, and/or apply a security policy). Additionally, or alternatively, main processing device 220 may store an entry for the flow. For example, main processing device 220 may store an entry in a main flow table.

In some implementations, the main flow table may store a flow identifier associated with the flow. For example, the flow identifier may include information that identifies the flow (e.g., five-tuple information, or the like). Additionally, or alternatively, the main flow table may store information identifying a security policy associated with the flow, an action associated with the flow (e.g., log, deny, and/or permit) that may be determined based on the security policy, or the like, which may allow subsequent packets of the flow to be processed based on the stored information. In this way, main processing device 220 may perform less packet processing on subsequent packets associated with the flow, thereby increasing throughput and decreasing latency.

As further shown in FIG. 4A, process 400 may include determining a service indicator associated with the flow (block 425). For example, main processing device 220 may determine a service indicator associated with the flow. In some implementations, a service indicator may include a parameter that indicates a priority level associated with a packet and/or a flow. In some implementations, the service indicator may be used to differentiate packets and/or flows to determine a priority of establishing entries in the express flow table (e.g., stored by express processing device 230).

In some implementations, the service indicator may include a value, such as a number (e.g., 0, 3, 5, or 7), a string (e.g., "green," "yellow," "orange," "red," "low," "medium," "high," or "express"), a range of values, or the like. In some implementations, the service indicator may include a same type of value as the capacity indicator (e.g., if the capacity indicator includes a number, then the service indicator may include a number, such that the service indicator and the capacity indicator can be compared to one another). Alternatively, the service indicator may be a different type of value than the capacity indicator (e.g., the capacity indicator may include a number whereas the service indicator may include a string). In such cases, main processing device 220 and/or express processing device 230 may map a number to a string (or a string to a number), thereby allowing the capacity indicator and the service indicator to be compared, as described in more detail elsewhere herein.

In some implementations, main processing device 220 may determine the service indicator based on a flow identifier associated with the packet (e.g., five-tuple information). Additionally, or alternatively, main processing device 220 may determine the service indicator based on a type of network network traffic associated with the packet (e.g., streaming media traffic, voice over IP (VoIP) traffic, Internet Protocol Security (IPsec) traffic, or teleconference traffic). In some implementations, main processing device 220 may determine the service indicator based on a priority indicator included in the packet (e.g., a class of service (CoS) value, a quality of service (QoS) value, a priority code point (PCP) value, a differentiated services code point (DSCP) value, an internal forwarding class value, and/or a type of service (ToS) value).

As further shown in FIG. 4A, process 400 may include determining whether the flow qualifies for express processing (block 430). For example, main processing device 220 may determine whether the flow qualifies for express processing. In some implementations, main processing device 220 may determine whether the flow qualifies for express processing based on comparing the service indicator and the first capacity indicator.

In some implementations, the capacity indicator may define a threshold. In this case, a service indicator that satisfies the threshold may qualify for express processing, whereas a service indicator that does not satisfy the threshold may not qualify for express processing. For example, if a capacity indicator includes the value "low," then a service indicator including the value "high" may qualify for express processing (e.g., information regarding a flow having the value "high" may be added to the express flow table). In this way, main processing device 220 may determine a capacity of the express flow table (e.g., based on the first capacity indicator), and may determine whether a flow qualifies for express processing based on the capacity of the express flow table and a priority associated with the flow (e.g., as determined by the service indicator).

As further shown in FIG. 4A, if the flow does not qualify for express processing (block 430—NO), then process 400 may include preventing an entry management message from being provided (block 435). For example, if main processing device 220 determines that the flow does not qualify for express processing, then main processing device 220 may prevent an entry management message from being provided to express processing device 230. In some implementations, main processing device 220 may store information indicating that the entry management message was not provided to express processing device 230 (e.g., using a counter). In this way, main processing device 220 may store information indicating that the flow did not qualify for express processing and/or may provide the information for display, which may allow a network operator to allocate additional resources to express processing device 230, or the like.

In some implementations, an entry management message may include an instruction for express processing device 230 to modify the express flow table. For example, an entry management message may instruct express processing device 230 to store an entry in the express flow table, delete an entry from the express flow table, update an entry in the express flow table, or the like. By preventing an entry management message from being provided to express processing device 230, main processing device 220 may prevent low priority flows that do not qualify for express processing from being stored in the express flow table, thereby improving throughput and reducing latency for high priority flows that qualify for express processing. Additionally, main processing device 220 may prevent unnecessary entry management messages from being provided to express processing device 230, thereby conserving processor, memory, and network resources.

As further shown in FIG. 4A, if the flow qualifies for express processing (block 430—YES), then process 400 may include providing an entry management message (block 440). For example, if main processing device 220 determines that the flow qualifies for express processing, then main processing device 220 may provide an entry management message to express processing device 230.

In some implementations, the entry management message may include an instruction for express processing device 230 to store an entry, associated with the flow, in the express flow table. Additionally, or alternatively, the entry management message may include the service indicator. For example, main processing device 220 may insert the service indicator into the entry management message (e.g., into a header, a trailer, or a payload). Additionally, or alternatively, main processing device 220 may provide the service indicator in association with the entry management message. Express processing device 230 may use the service indicator to determine whether to store an entry for the flow in the express flow table, as described below.

As shown in FIG. 4B, process 400 may include receiving the entry management message and identifying the service indicator (block 445), determining a second capacity indicator associated with the flow table (block 450), and determining whether the flow qualifies for express processing (block 455). For example, express processing device 230 may receive the entry management message from main processing device 220 and may identify the service indicator (e.g., included in or associated with the entry management message). Express processing device 230 may determine a second capacity indicator, associated with the express flow table, and may determine whether the flow qualifies for express processing based on the service indicator and the second capacity indicator. For example, express processing device 230 may determine the second capacity indicator associated with the express flow table in a similar manner as described above in connection with block 410, and may determine whether the flow qualifies for express processing in a similar manner as described above in connection with block 430.

In some implementations, the second capacity indicator may be different than the first capacity indicator because the second capacity indicator and the first capacity indicator are determined at different times. For example, the express flow table may include a different quantity of entries when the second capacity indicator is determined as compared to when the first capacity indicator is determined.

As further shown in FIG. 4B, if the flow does not qualify for express processing (block 455—NO), then process 400 may include preventing an entry, associated with the flow, from being added to the flow table (block 460). For example, if express processing device 230 determines that the flow does not qualify for express processing, then express processing device 230 may prevent an entry, associated with the flow, from being added to the express flow table. In some implementations, express processing device 230 may store information indicating that express processing device 230 prevented an entry, associated with the flow, from being added to the express flow table (e.g., using a counter). In this way, express processing device 230 may provide information (e.g., for display to a network operator) identifying a quantity of entries that were prevented from being entered in the express flow table, which, may allow the network operator to provide input to allocate additional resources to express processing device 230 (if necessary).

In some implementations, if a flow qualifies for express processing at a first time (e.g., based on the first capacity indicator) but does not qualify at a second time (e.g., based on the second capacity indicator), then express processing device 230 may prevent an entry, associated with the flow, from being stored in the express flow table. For example, the express flow table may include a greater number of entries when the second capacity indicator is determined as compared to when the first capacity is determined. Thus, the available capacity to store additional entries in the express flow table may be reduced. In this way, express processing device 230 may allocate memory space in the express flow table for entries associated with high priority flows, thereby reducing latency and improving throughput for the high priority flows.

As further shown in FIG. 4B, if the flow qualifies for express processing (block 455—YES), then process 400 may include storing an entry, associated with the flow, in the flow table (block 465). For example, if express processing device 230 determines that the flow qualifies for express processing, then express processing device 230 may store an entry, associated with the flow, in the express flow table. In some implementations, the entry may include a flow identifier (e.g., five-tuple information), information identifying a security policy associated with the flow, an action associated with the flow (e.g., log, deny, or permit), or the like.

In some implementations, the express flow table may not have memory space for an additional entry. In such cases, express processing device 230 may identify an entry that no longer qualifies for express processing and may delete the entry. In this way, memory space associated with the express flow table may be allocated for high priority flows.

Implementations described herein may assist a security processing system 210 in ensuring that a flow qualifies for express processing. For example, as described above, main processing device 220 may determine whether the flow qualifies for express processing at a first time, and may provide an entry management message based on determining that the flow qualifies for express processing. In this way, entry management messages for flows that do not qualify for express processing may be prevented, thereby conserving processor and/or memory resources. Additionally, express processing device 230 may determine whether the flow qualifies for express processing at a second time. For example, as described above, an available capacity of the express flow table to store additional entries may be different when the second capacity indicator is determined as compared to when the first capacity indicator is determined. In this way, express processing device 230 may prevent an entry for a flow from being stored when the flow does not qualify for express processing, thereby allocating space in the express flow table for entries associated with higher priorities.

In this way, express processing device 230 may receive additional packets associated with the flow, and may process and/or transmit the packets (e.g., to a peer device 240) based on identifying the entry and/or based on stored information in the express flow table. Additionally, express processing device 230 may process and/or transmit the packets without providing the packets to main processing device 220 for further packet processing (e.g., may perform express processing), thereby reducing latency, improving throughput, and conserving processor and/or memory resources associated with main processing device 220.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Implementations described herein may assist a security processing system in managing flow table entries for express packet processing. For example, implementations described herein may assist an express processing device in storing entries for flows having a particular priority (e.g., requiring a particular latency, throughput, or the like), thereby reducing latency, improving throughput, or the like. Additionally, implementations described herein may reduce a quantity of entry management messages provided by a main processing device, thereby conserving processor and/or memory resources. Additionally, implementations described herein may reduce a quantity of entry management messages that an express processing device is required to process, thereby increasing a packet processing speed. Additionally, implementations described herein may assist an express processing device in providing express processing for a flow without requiring that the main processing device process the flow, thereby conserving processor and/or memory resources and decreasing latency.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
a memory; and
one or more processors to:
identify a capacity indicator associated with a packet,
the packet being associated with a flow, and
the capacity indicator identifying capacity information associated with a flow table at a second device;
determine a service indicator that indicates a priority associated with at least one of the packet or the flow;
determine whether the flow qualifies for express processing based on the capacity indicator and the service indicator; and
selectively provide a message to the second device based on determining whether the flow qualifies for express processing,
the message including an instruction for the second device to store an entry, associated with the flow, in the flow table.

2. The first device of claim 1, where the capacity indicator is included in the packet.

3. The first device of claim 1, where the one or more processors are further to:
process the packet; and
store the entry for the flow based on processing the packet.

4. The first device of claim 1, where the service indicator indicates a priority of establishing the entry in the flow table.

5. The first device of claim 1, where the one or more processors, when determining whether the flow qualifies for express processing, are to:
compare the service indicator and the capacity indicator.

6. The first device of claim 5, where the one or more processors, when determining whether the flow qualifies for express processing, are to:
    determine that the flow qualifies for express processing based on the service indicator having a higher value than the capacity indicator.

7. The first device of claim 1, where the one or more processors are further to:
    prevent the message from being provided based on determining that the flow does not qualify for express processing.

8. A method, comprising:
    identifying, by a device, a service indicator based on a message;
    determining, by the device, a capacity indicator associated with a flow table;
    determining, by the device, whether a flow qualifies for express processing based on the service indicator and the capacity indicator; and
    selectively storing, by the device, an entry associated with the flow in the flow table based on determining whether the flow qualifies for express processing.

9. The method of claim 8, further comprising:
    preventing the entry from being added to the flow table based on determining that the flow does not qualify for express processing.

10. The method of claim 8, further comprising:
    storing information indicating that the entry was prevented from being added to the flow table based on determining that the flow does not qualify for express processing.

11. The method of claim 8, where the entry includes a flow identifier.

12. The method of claim 8, where the entry includes information identifying a security policy associated with the flow.

13. The method of claim 8, where the entry includes information identifying an action associated with the flow.

14. The method of claim 8, further comprising:
    determining that the entry does not qualify for express processing; and
    deleting the entry based on determining that the entry does not qualify for express processing.

15. A non-transitory computer-readable medium storing instructions, the instructions comprising:
    one or more instructions that, when executed by one or more processors, cause the one or more processors to:
        identify a capacity indicator associated with a packet,
            the packet being associated with a flow, and
            the capacity indicator identifying capacity information associated with a flow table at a device;
        determine a service indicator that indicates a priority associated with at least one of the packet or the flow;
        determine whether the flow qualifies for express processing based on the capacity indicator and the service indicator; and
        selectively provide a message to the device based on determining whether the flow qualifies for express processing,
            an entry, associated with the flow, being stored in the flow table based on the message.

16. The non-transitory computer-readable medium of claim 15, where the one or more instructions, when executed by the one or more processors, further cause the one or more processors to:
    store information indicating that the message was not provided to the device based on determining that the flow does not qualify for express processing.

17. The non-transitory computer-readable medium of claim 15, where the message includes the service indicator.

18. The non-transitory computer-readable medium of claim 15, where another capacity indicator is determined based on the message; and
    where a determination of whether the flow qualifies for express processing is made based on the other capacity indicator.

19. The non-transitory computer-readable medium of claim 18, where the entry is stored in the flow table based on the other capacity indicator indicating that the flow qualifies for express processing.

20. The non-transitory computer-readable medium of claim 18, where the entry is prevented from being added to the flow table based on the other capacity indicator indicating that the flow does not qualify for express processing.

* * * * *